United States Patent
Kyle et al.

[11] Patent Number: 5,860,024
[45] Date of Patent: Jan. 12, 1999

[54] MICROPROCESSOR WITH AUTOMATIC NAME GENERATION INCLUDING PERFORMANCE INDICATION

[75] Inventors: David G. Kyle, Austin, Tex.; Sherman Lee, Rancho Palos Verdes, Calif.

[73] Assignee: Advanced Micro Devices, Inc., Sunnyvale, Calif.

[21] Appl. No.: 631,941

[22] Filed: Apr. 15, 1996

[51] Int. Cl.$^6$ .......................... G06F 11/27; G01K 23/00
[52] U.S. Cl. .................. 395/836; 395/183.06; 395/555; 327/39
[58] Field of Search .............. 395/183.06, 555, 395/520, 500, 836; 327/39

[56] References Cited

U.S. PATENT DOCUMENTS

| | | | |
|---|---|---|---|
| 4,689,581 | 8/1987 | Talbot | 331/1 A |
| 4,964,074 | 10/1990 | Suzuki et al. | 395/500 |
| 5,365,514 | 11/1994 | Hershey et al. | 370/241 |
| 5,394,529 | 2/1995 | Brown, III et al. | 395/587 |
| 5,493,683 | 2/1996 | Cloud et al. | 395/750 |
| 5,551,012 | 8/1996 | Chuang et al. | 395/500 |
| 5,572,716 | 11/1996 | Meisner | 395/555 |
| 5,675,825 | 10/1997 | Dreyer et al. | 395/800.42 |

FOREIGN PATENT DOCUMENTS 0 574 991 A   12/1993   European Pat. Off. ........ G06F 13/40

OTHER PUBLICATIONS

IBM Technical Disclosure Bulletin, vol. 36, No. 9A, Sep. 1, 1993. pp. 237/238 "Generation of Extended Processor Identification Bits".

IBM Technical Disclosure Bulletin, vol. 38, No. 1, Jan. 1, 1995, p. 547 "Microprocessor Identifier".

*Primary Examiner*—Larry D. Donaghue
*Assistant Examiner*—John Follansbee
*Attorney, Agent, or Firm*—Fliesler, Dubb, Meyer & Lovejoy, LLP

[57] ABSTRACT

A microprocessor with automatic and dynamic partname determination including performance number. The microprocessor includes circuitry that measures a core clock frequency for the microprocessor and circuitry that determines a performance indication for the microprocessor in response to the measured core clock frequency.

23 Claims, 4 Drawing Sheets

MICROPROCESSOR WITH AUTOMATIC NAME GENERATION INCLUDING PERFORMANCE INDICATION

BACKGROUND OF THE INVENTION

1. Field of Invention

The present invention pertains to the field of microprocessors. More particularly, this invention relates to a microprocessor having a mechanism for determining a microprocessor performance indication.

2. Art Background

Prior computer systems typically contain one or more processors that execute code or instructions for an operating system, application programs and other software elements of the computer system. Such a processor may be referred to as a central processing unit (CPU). In addition, some processors are implemented on an integrated circuit chip. Such processors may be referred to as CPU chips or microprocessors.

Such microprocessors are typically available from a variety of integrated circuit chip manufacturers. In addition, chip manufacturers usually market microprocessors with a variety of architectures. For example, some microprocessors implement an architecture which may be referred to as a superscaler architecture. Such a superscaler microprocessor usually has the capability to execute multiple instructions concurrently. In addition, some microprocessors contain specialized circuitry such as on-chip cache circuitry.

Typically, the instruction execution performance of a microprocessor depends on a particular architecture. The architecture of a particular microprocessor is usually indicated by a partname for the microprocessor. For example, prior microprocessors that conform to the x86 architecture have partnames such as "486SX" or "486DX" that indicate a particular architecture.

In addition, chip manufacturers typically market microprocessors having a variety of available clock speeds. In general, a higher clock speed for a microprocessor yields higher instruction execution performance. Typically, the clock speed of a particular microprocessor is indicated in the partname. For example, prior microprocessors that conform to the x86 architecture commonly have partnames such as "486DX33" and "486DX66" that indicate clock speeds of 33 and 66 MHz, respectively.

Typically, the operating system for such a computer system includes functions for determining the partname of the microprocessor installed in the system. In addition, a set of basic input/output software (BIOS) for such a computer system usually includes functions for determining the microprocessor partname. Such microprocessor identification has a variety of uses and provides the operating system, application programs, and the system user with an indication of the performance of the particular microprocessor installed in a system.

The operating system or BIOS in such a computer system commonly include functions for determining the clock speed of the microprocessor. Typically, such an operating system or BIOS determines the microprocessor clock speed by performing timing measurements during execution of pre-determined instructions. For example, such a clock speed measurement usually enables the operating system or BIOS to determine the "33" or "66" portions of the partnames "486DX33" or "486DX66" of prior x86 microprocessors.

In addition, prior microprocessors commonly provide specialized instructions that enable software elements such as an operating system to retrieve a microprocessor identifier. For example, microprocessors that conform to the x86 architecture typically provide a CPUID instruction. The CPUID instruction returns a character string that identifies the chip manufacturer along with a variety of microprocessor attribute indications.

Typically, the manufacturer of a particular family of microprocessor chips provides performance information to operating system vendors and BIOS vendors. Such performance information usually enables the operating system or BIOS to convert the information returned by the CPUID instruction into the "486DX" or "486SX" portions of the partnames "486DX33" or "486DX66" of prior x86 microprocessors.

Chip manufactures typically evolve microprocessor architectures on a development schedule independent of the schedule of new software releases by operating system vendors and BIOS vendors. As a consequence, the performance information for a particular operating system or BIOS release may be out of sync with the performance information for newer microprocessor chips. Unfortunately, such an information mismatch can cause an operating system or BIOS to misidentify the particular microprocessor installed in a system.

Recently, the rate of advancement in microprocessor architectures and process technologies has accelerated. Unfortunately, such rapid microprocessor evolution increase the likelihood that an operating system or BIOS will misidentify the microprocessor installed in a particular system due to such an information mismatch.

In addition, clock speed is becoming a less meaningful indication of microprocessor performance with the more recent advances in superscaler architectures and on-chip caching. As a consequence, the clock speed portion of the partname of a microprocessor is being replaced by a microprocessor performance number or Pnumber. Typically, such a microprocessor performance number provides a relative performance indication in relation to a benchmark microprocessor. Unfortunately, such a move to Pnumbers complicates the operating system or BIOS functions for determining a partname of a microprocessor and increase the likelihood of misidentification.

One possible solution to such microprocessor misidentification is to hard-code a partname directly onto the silicon of the microprocessor chip. The operating system or BIOS could then read the partname directly without relying on performance information which may be out of date. Unfortunately, the clock speed a particular microprocessor chip, which is an important factor in determining a Pnumber, is usually not known until after a chip sorting step in the manufacturing process. In such a chip sorting step, the manufacturer typically performs timing tests on individual microprocessor chips to determine a certified clock speed. As a consequence, a key factor for hard-coding the Pnumber is not available until after chip fabrication and cannot be hard-coded in silicon.

Another possible solution is to include a non-volatile memory on the microprocessor chip. After the clock speed is determined during the chip sorting step, the Pnumber could be programmed into the non-volatile memory on the microprocessor chip. Unfortunately, processes for forming non-volatile memories are typically incompatible with the high speed logic processes that are employed to manufacture leading edge microprocessor chips.

SUMMARY AND OBJECTS OF THE INVENTION

One object of the present invention is to provide a microprocessor chip with automatic name generation.

Another object of the present invention is to provide a microprocessor chip that dynamically determines a microprocessor performance indication.

A further object of the present invention is to provide a microprocessor that reports a partname including performance indication in response to a predetermine instruction.

These and other objects are provided by a microprocessor that includes circuitry that measures a core clock frequency for the microprocessor and circuitry that determines a performance indication for the microprocessor in response to the measured core clock frequency.

Other objects, features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
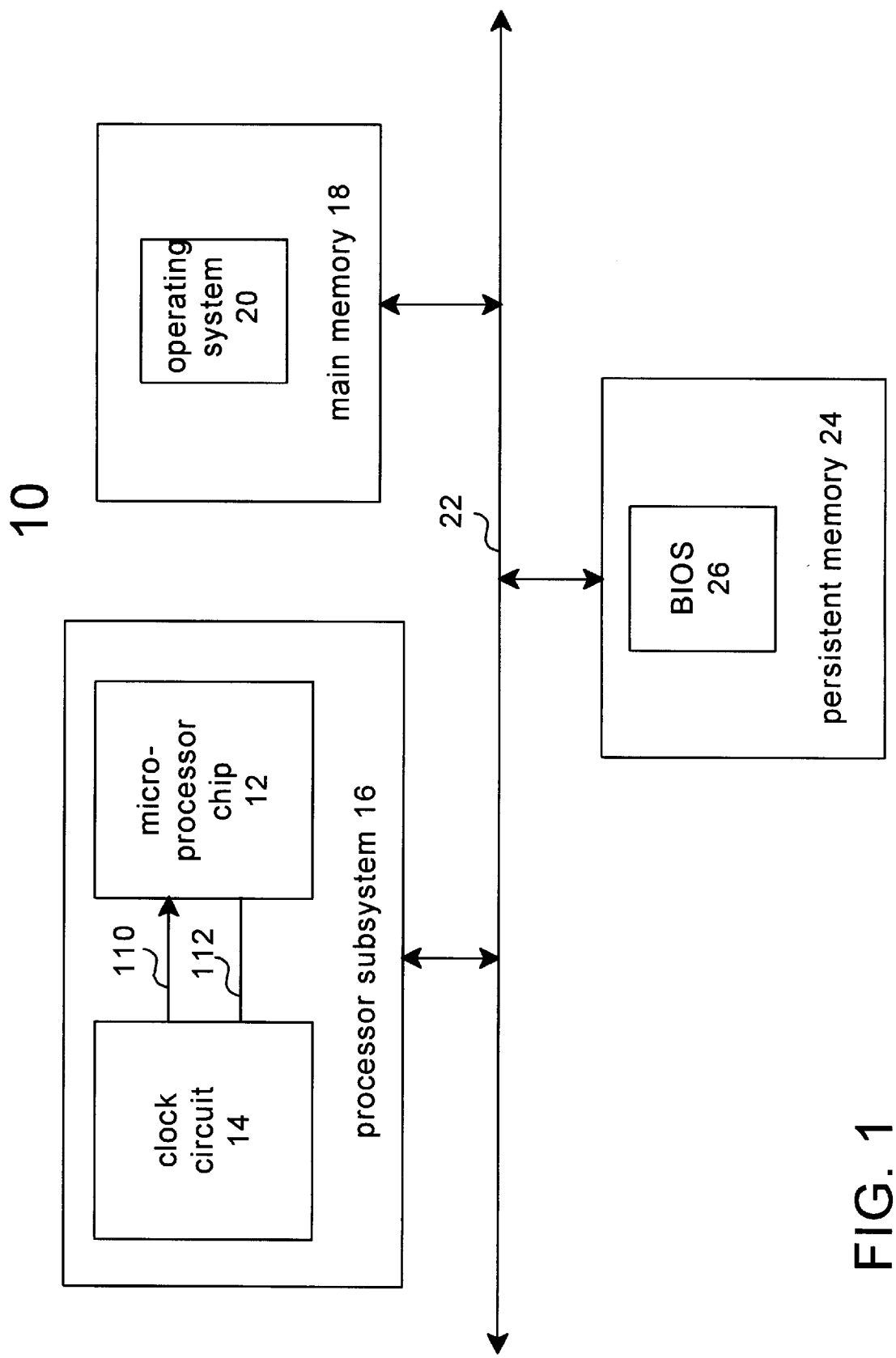
FIG. 1 illustrates elements of a computer system including a processor subsystem with a microprocessor chip.

FIG. 1 illustrates elements of a computer system 10. The computer system 10 includes a processor subsystem 16, a main memory 18, and a persistent memory 24. The processor subsystem 16 communicates with the main memory 18 and the persistent memory 24 via a system bus 22.

The processor subsystem 16 includes a microprocessor chip 12 and a clock circuit 14. The clock circuit 14 generates a system clock signal 110 and a reference clock signal 112. The system clock signal 110 and the reference clock signal 112 are each coupled to the microprocessor chip 12 through a corresponding input pin.

The main memory 18 accommodates an operating system 20 as well as a variety of other software elements of the computer system 10. In addition, the persistent memory 24 stores a set of basic input/output software (BIOS) 26 in non-volatile form. Both the operating system 20 and the BIOS 26 include a microprocessor identifier instruction that causes the microprocessor chip 12 to return a partname. The partname includes a performance number or Pnumber for the microprocessor chip 12.

In one embodiment, the microprocessor chip 12 conforms to the x86 microprocessor architecture, and the instruction for returning the partname comprises the CPUID instruction of the x86 instruction set.

Figure 2:
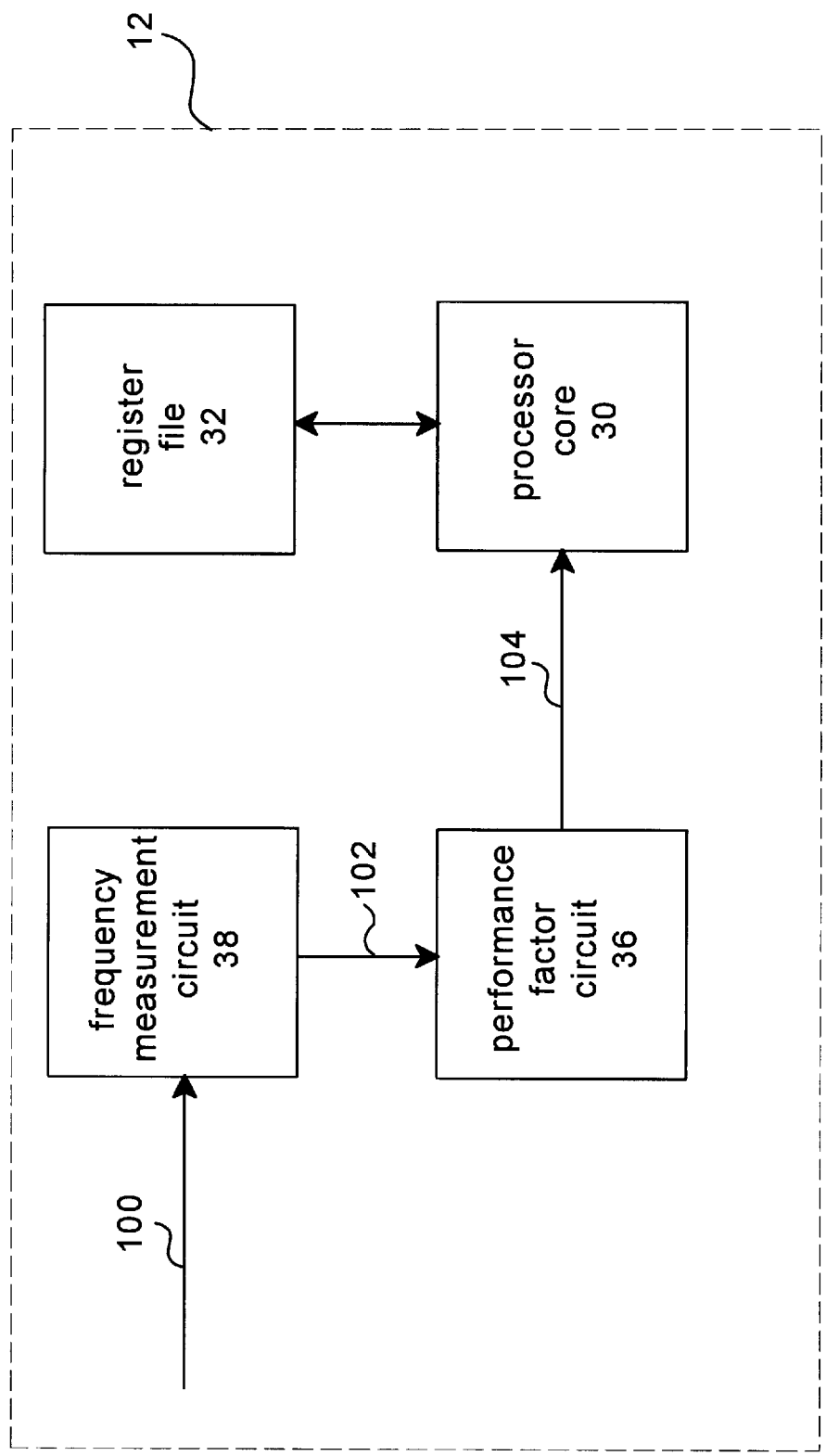
FIG. 2 illustrates elements of the microprocessor chip including a frequency measurement circuit and a performance factor circuit.

FIG. 2 illustrates elements of the microprocessor chip 12. The microprocessor chip 12 includes a processor core 30 and a register file 32. The microprocessor chip 12 also includes a frequency measurement circuit 38 and a performance factor circuit 36.

The frequency measurement circuit 38 measures the frequency of a core clock signal 100. The core clock signal 100 synchronizes logic functions in the microprocessor chip 12 and runs at a frequency that is determined by a chip sorting step on the microprocessor chip 12. The performance factor circuit 36 determines a performance indication or a Pnumber for the microprocessor chip 12 in response to the measured speed of the core clock signal 100.

The processor core 30 fetches and executes instructions contained in the operating system 20 and the BIOS 26 including the miroprocessor identifier instruction. In one embodiment, the processor core 30 executes an x86 CPUID instruction for retrieving the partname of the microprocessor 12 and stores the results in a set of x86 architectural registers contained in the register file 32. The registers include, for example, EAX, EBX, ECX, and EDX registers.

The frequency measurement circuit 38 generates a core clock frequency indication 102. The core clock frequency indication 102 specifies the frequency the core clock signal 100 which synchronizes instruction execution in the processor core 30. The performance factor circuit 36 converts the core clock frequency indication 102 into a performance number indication 104. The performance number indication 104 provides a Pnumber portion for the partname of the microprocessor chip 12.

The performance number indication 104 is provided to the processor core 30 during execution of a microprocessor identifier instruction in the processor core 30. The processor core 30 uses the performance number indication 104 for the Pnumber portion of the partname for the microprocessor chip 12 and stores the partname into the register file 32. The registers containing the partname including performance number are thereafter available for access and use by either the operating system 20 or the BIOS 26.

In one embodiment, the portions of the partname other than the Pnumber are fixed character strings that indicate the architecture implemented in the microprocessor chip 12. The fixed portions of the partname may be stored or hard coded, for example, in a control store of a microinstruction sequencer within the processor core 30.

Figure 3:
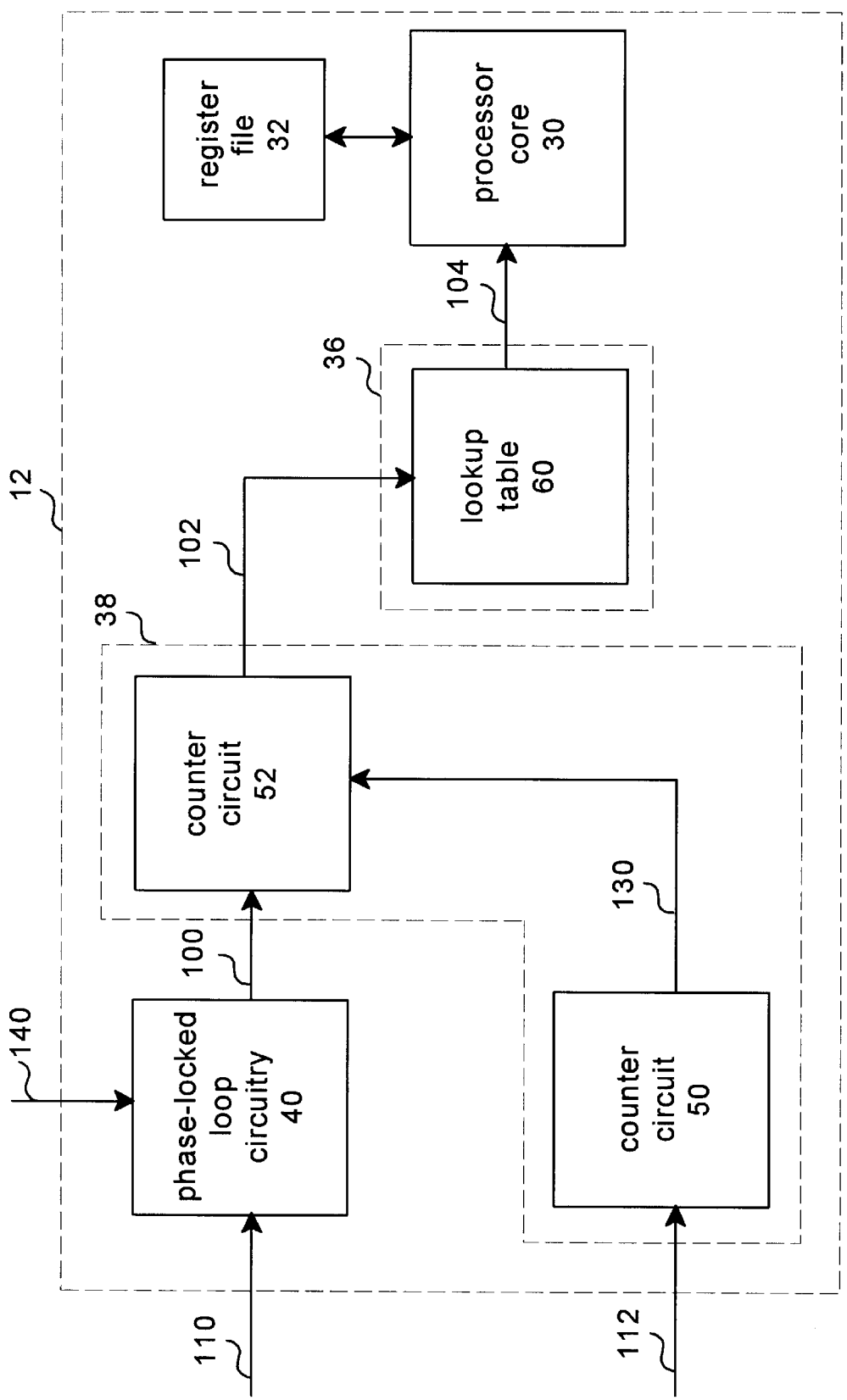
FIG. 3 illustrates one embodiment of the frequency measurement circuit and one embodiment of the performance factor circuit.

FIG. 3 illustrates one embodiment of the frequency measurement circuit 38 and one embodiment of the performance factor circuit 36. The frequency measurement circuit 38 includes a pair of counter circuits 50 and 52 and the performance factor circuit 36 comprises a lookup table 60.

In addition, the microprocessor chip 12 includes a set of phase-locked looped circuitry 40 that generates the core clock signal 100. The phase-locked looped circuitry 40 receives the system clock signal 110 from the clock circuit 14. The phase-locked looped circuitry 40 multiplies the system clock signal 110 by a clock multiplier factor.

The relationship between the frequency of the core clock signal 100 and the frequency of the system clock signal 110, i.e. the clock multiplier factor, is determined by a set of inputs 140 to the phase-locked looped circuitry 40. The inputs 140 are determined by external jumpers coupled to input/output pins of the microprocessor chip 12. The inputs 140 enable external selection of the clock frequency multiplier factor used by the phase-lock looped circuitry 40.

The counter circuit 50 receives the reference clock signal 112 from the clock circuit 14 through an input pin of the microprocessor chip 12 while the counter circuit 52 receives the core clock signal 100 from the phase locked loop circuitry 40. The counter circuit 50 is initialized with a predetermined count value. The counter circuit 50 counts down from the predetermined count value while the counter circuit 52 counts periods of the core clock signal 100. The counter circuit 50 generates a gate signal 130 that controls an active period of the counter circuit 52. The gate signal 130 causes the counter circuit 52 to start counting when the predetermined count value is initialized and then to stop counting periods the CPU clock signal 100 when the predetermined count value expires. When the counter circuit 52 stops counting, the counter value 102 from the counter circuit 52 indicates the frequency of the core clock 100.

For example, if the reference clock signal 112 has a frequency equal to $f_{ref}$ and the core clock signal 100 has a frequency equal to $f_{core}$ and the predetermined count value in the counter circuit 50 equals n, then the gate signal 130 causes the counter circuit 52 to count periods of the core clock signal 100 for a time interval T1 equal to $n/f_{ref}$. The final count reached by the counter circuit 52 and indicated by the counter value 102 is equal to $f_{core}$ * T1. The counter value 102 is proportional to the frequency of the core clock signal 100 and provides an index to individual entries of the lookup table 60. Each entry in the lookup table 60 corresponds to a particular frequency of the core clock signal 100 and stores a performance number for the corresponding core clock frequency.

Figure 4:
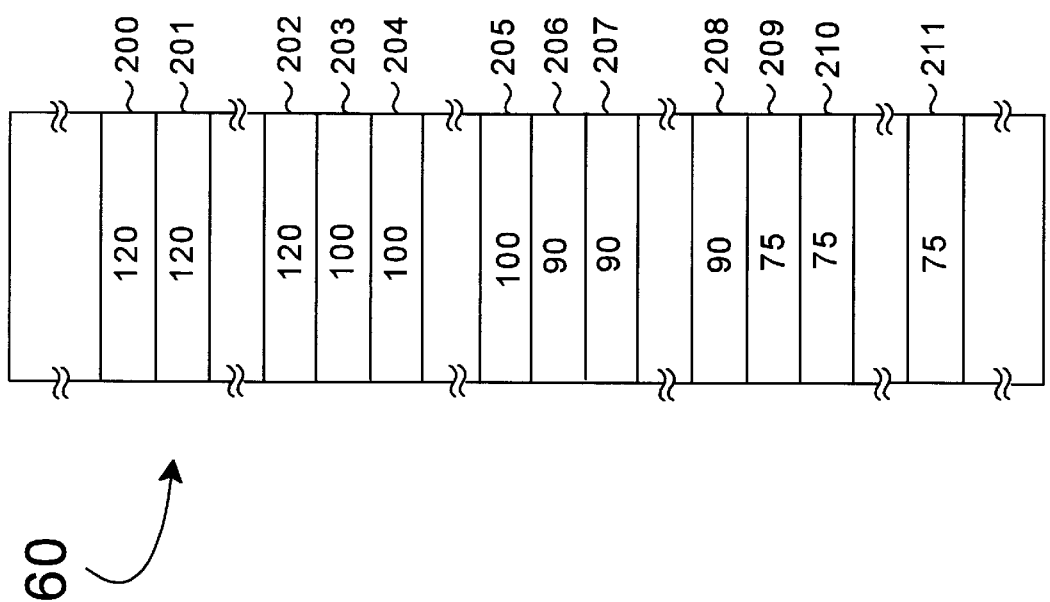
FIG. 4 illustrates the entries contained in the lookup table which in one embodiment provides the performance factor circuit.

FIG. 4 illustrates one embodiment of the performance number information contained in the lookup table 60. The lookup table 60 includes a set of entries 200–211. The lookup table 60 may be implemented, for example, as a programmable logic array (PLA). Each entry 200–211 stores a performance number or Pnumber for the microprocessor chip 12. The entries 200–211 are indexed or addressed by the counter value 102 or a portion of the counter value 102 from the frequency measurement circuitry 38.

The entries 200–202 are addressed by higher frequency values of the core clock signal 100 as indicated by the counter value 102. As a consequence, the performance numbers or Pnumbers stored in the entries 200–202 are higher than the performance numbers stored in the entries 209–211.

Multiple adjacent sets of entries 200–211 store identical performance numbers to provide a rounding function on the performance number indication 104. For example, the entries 200–202 all contain a performance number equal to 120. A range of core clock frequency values as indicated by the counter value 102 yield identical performance numbers for transfer to the processor core 30.

In an alternative embodiment, the performance factor circuit 36 is implemented with a register that contains a fixed performance factor and a multiplier circuit that multiplies the fixed performance factor by the counter value 102 that indicates the core clock frequency.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A microprocessor comprising:
   a core clock frequency circuit configured to produce a core clock signal that synchronizes execution of instructions in a processor core of said microprocessor;
   a frequency measurement circuit configured to produce a core clock frequency indication that specifies a frequency of said core clock signal; and
   a performance factor circuit configured to convert said core clock frequency indication into a performance number (Pnumber) and provide said Pnumber to said processor core.

2. The microprocessor according to claim 1, wherein the processor core reports the performance number by storing the performance number into a predetermined register in the microprocessor.

3. The microprocessor according to claim 1, wherein the processor core reports a fixed portion of a partname for the microprocessor.

4. The microprocessor of according to claim 3, wherein the fixed portion of the partname in combination with the performance number provides the partname for the microprocessor.

5. The microprocessor according to claim 1, further comprising:
   a register file for storage of data;
   wherein:
      said Pnumber is provided to said processor core upon execution of a microprocessor identifier instruction by said processor core:
      said Pnumber is utilized by said microprocessor to identify a partname for said microprocessor; and
      said microprocessor, upon identification of said partname, stores said partname in said register file.

6. The microprocessor according to claim 5, wherein the microprocessor identifier instruction is contained in an operating system for a computer system that includes the microprocessor.

7. The microprocessor according to claim 5, wherein the microprocessor identifier instruction is contained in a set of basic input/output software (BIOS) for a computer system that includes the microprocessor.

8. The microprocessor according to claim 5, wherein:
   said microprocessor stores said partname in a predetermined portion of said register file; and
   said predetermined portion of said register file is accessible by at least one of an operating system hosted on said microprocessor, and a BIOS function working in conjunction with said microprocessor.

9. The microprocessor according to claim 8, wherein said frequency measurement circuit comprises:
   a first counter, initialized with a predetermined count value (n) connected to a reference clock signal (fref) from an input pin of said microprocessor, and configured to assert a gate signal while counting down from said predetermined count value in accordance with said reference clock signal; and
   a second counter, connected to said gate signal and said core clock, and configured to count a period of said core clock signal while said gate signal is asserted and provide the core clock signal count to said performance factor circuit as said core clock frequency indication.

10. The microprocessor circuit according to claim 9, wherein said performance factor circuit comprises a lookup table having at least one Pnumber associated with at least one core clock frequency.

11. The microprocessor according to claim 10, wherein said lookup table includes plural sets of more than one core clock frequency, each frequency of any one set corresponding to a single Pnumber.

12. The microprocessor according to claim 9, wherein said performance factor circuit comprises:
   a register that contains a fixed performance factor; and
   a multiplier that multiplies said fixed performance factor by the core clock signal count to determine said Pnumber.

13. The microprocessor according to claim 1, further comprising circuitry for executing a microprocessor identifier instruction and for reporting the performance number.

14. The microprocessor according to claim 1, wherein the circuitry for reporting the performance number includes a predetermined register and circuitry for storing the performance number into the predetermined register.

15. The microprocessor according to claim 13, further comprising circuitry for reporting a fixed portion of a partname for the microprocessor.

16. The microprocessor according to claim 1, wherein said frequency measurement circuit comprises:

a first counter circuit that counts cycles of a reference clock for the microprocessor; and second counter circuit that counts cycles of a core clock in the microprocessor.

17. The microprocessor according to claim 16, wherein said performance factor circuit comprises a lookup table which is coupled to an output of the second counter circuit.

18. A microprocessor chip, comprising;

circuitry for measuring a core clock frequency for the microprocessor; and circuitry for determining a performance indication for the microprocessor in response to the measured core clock frequency;

wherein:

said circuitry for measuring a core clock frequency comprises, a first counter circuit that counts cycles of a reference clock for the microprocessor, and a second counter circuit that counts cycles of a core clock in the microprocessor;

said circuitry for determining a performance indication comprises a lookup table coupled to an output of the second counter circuit; and said lookup table stores a set of predetermined performance indicators for the microprocessor such that the core clock frequency selects one of the predetermined performance indicators.

19. A method of determining performance of a microprocessor, comprising the steps of:

producing a core clock signal that synchronizes execution of instructions in a processor core of said microprocessor;

producing a core clock frequency indication that specifies a frequency of said core clock signal; and converting said core clock frequency indication into a performance number (Pnumber) and provide said Pnumber to said processor core.

20. The method according to claim 19, further comprising the steps of:

executing a microprocessor identifier instruction; and reporting the performance number.

21. The method according to claim 20, wherein said step of reporting the performance number comprises the step of storing the performance number into a predetermined register in the microprocessor.

22. The method according to claim 20, wherein said step of reporting the performance number comprises the step of storing a fixed portion of a partname for the microprocessor.

23. The method according claim 22, wherein the fixed portion of the partname in combination with the performance number provides the partname for the microprocessor.

* * * * *